United States Patent
Eriksen

(10) Patent No.: US 8,894,913 B2
(45) Date of Patent: Nov. 25, 2014

(54) METHOD FOR PRODUCTION OF AN ACID PROOF, SEEMLESS PRESSURE VESSEL

(75) Inventor: Egil Eriksen, Foldrøyhamm (NO)

(73) Assignee: Tool-Tech AS, Rykkinn (NO)

( * ) Notice: Subject to any disclaimer, the term of this patent is extended or adjusted under 35 U.S.C. 154(b) by 694 days.

(21) Appl. No.: 13/121,654

(22) PCT Filed: Oct. 8, 2009

(86) PCT No.: PCT/NO2009/000350
§ 371 (c)(1),
(2), (4) Date: May 24, 2011

(87) PCT Pub. No.: WO2010/041957
PCT Pub. Date: Apr. 15, 2010

(65) Prior Publication Data
US 2011/0215510 A1    Sep. 8, 2011

(30) Foreign Application Priority Data
Oct. 10, 2008  (NO) .................................. 20084267

(51) Int. Cl.
*B22F 3/04*  (2006.01)
*C04B 35/645*  (2006.01)
*F16J 12/00*  (2006.01)
*B22F 3/15*  (2006.01)

(52) U.S. Cl.
CPC ... *F16J 12/00* (2013.01); *B22F 3/15* (2013.01)
USPC ............................................. 264/604; 419/49

(58) Field of Classification Search
CPC .......... F16J 12/00; B22F 3/15; C04B 35/6455
USPC ............................................. 264/604; 419/49
See application file for complete search history.

(56) References Cited

U.S. PATENT DOCUMENTS

| 3,418,112 A | 12/1968 | Zoran |
| 3,674,394 A * | 7/1972 | Wiltshire ...................... 425/112 |
| 4,135,286 A | 1/1979 | Wright et al. |

FOREIGN PATENT DOCUMENTS

| EP | 0038010 A1 | 10/1981 |
| EP | 1657010 A1 | 5/2006 |
| EP | 1779946 A1 | 5/2007 |
| FR | 2796322 A1 | 1/2001 |

OTHER PUBLICATIONS

International Search Report for Application No. PCT/NO2009/000350, dated Dec. 16, 2009.

\* cited by examiner

*Primary Examiner* — Erin Snelting
(74) *Attorney, Agent, or Firm* — Patterson & Sheridan, L.L.P.

(57) ABSTRACT

The invention relates to a method for production of a cylindrical acid proof, seamless pressure vessel having hemispherical top and bottom by powder molding in an HIP (Hot Isostatic Pressing) process. Sheet metal molds are produced constituting an internal shell, lower part of an external shell, upper part of an external shell with filling spout with corresponding top and bottom. Distance pins decide the wall thickness and are mounted outward from the internal shell which is led down into the lower part of external shell whereafter shell part with filling spout closes the volume between the internal and external shells which is then filled with powder through the filling spout. The pressure vessel is placed in an HIP-process container for vacuuming, sealing, supply of high-pressure inert gas such as argon, at high temperature such as 1000° C., for processing together with the distance pins to a compact and homogenous material.

8 Claims, 2 Drawing Sheets

METHOD FOR PRODUCTION OF AN ACID PROOF, SEEMLESS PRESSURE VESSEL

Figure 1:
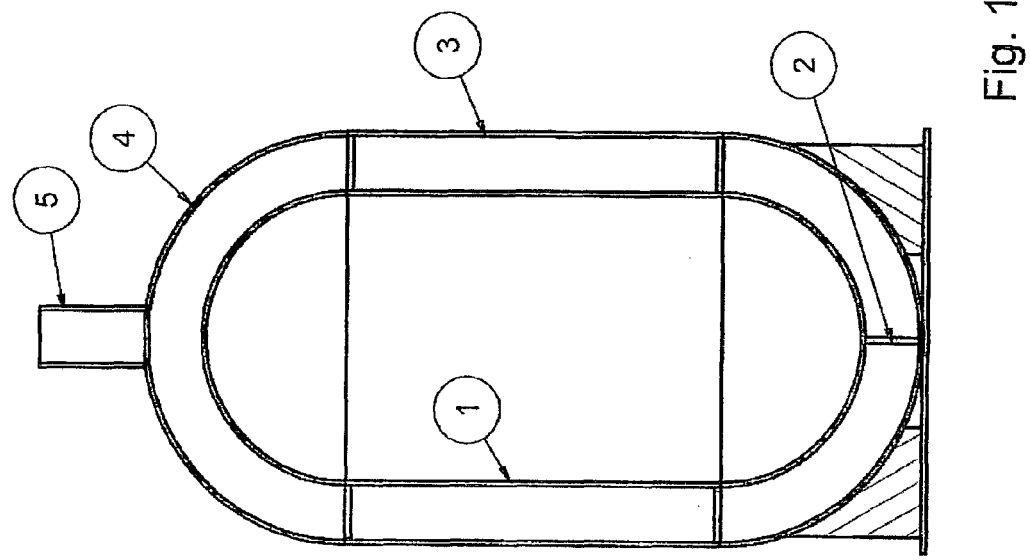
Figure 1:
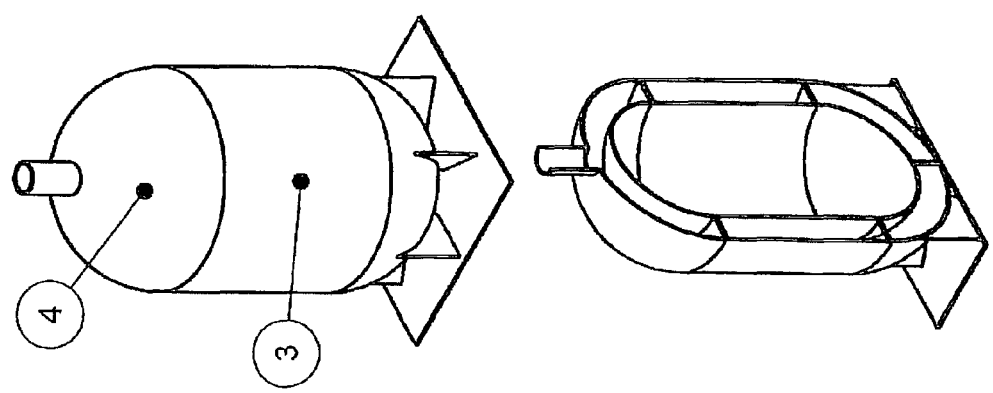

The invention relates to a method for production of an acid proof, seamless pressure vessel, as stated in the introduction to the accompanying claim 1.

There is an increasing need for large high-pressure accumulators of the bladder type in the subsea industry. In today's subsea control systems it is common to store hydraulic energy on the surface in hydraulic units having pumps and hydraulic accumulators.

Piston accumulators are generally used in surface equipment while bladder accumulators are preferred for subsea use. The bladder accumulators are simpler, cheaper, easier to maintain and more reliable than piston accumulators. Bladder accumulators also have shorter delivery times.

The standard piston accumulators are, however, available in higher pressure classes and with larger volume than standard bladder accumulators, and they may be equipped with position reading of the piston for monitoring of gas tightness.

The hydraulic energy for activating various functions are distributed from a surface installation to the subsea equipment via hydraulic control lines collected in an umbilical running down to the subsea equipment. To reduce response times for actuation of subsea equipment and to ensure a stable operating pressure it is common to fit an additional accumulator locally on the subsea equipment.

Large costs and technical limitations are tied to hydraulic distribution between the hydraulic unit on the surface vessel and the subsea equipment via an umbilical. Water depths and distances are steadily increasing requiring pumps and accumulators to be fitted on the subsea equipment itself. This relates to both permanent production systems and control systems used in connection with various operations.

Concerning well operations there is established through rules and specifications a requirement for available stored energy for closing, opening and closing of all valve actuators. There is also a requirement for such as emergency disconnection of equipment during operations.

When hydraulic energy is to be established and stored for actuation of various subsea functions, a pump is used to charge the accumulators to the desired pressure. There will be pressure regulators downstream of the accumulators and the outlet pressure from the accumulator is adjusted down to the operating pressure. The operating pressure will with consumption fall to a level where the regulators let the stored energy out to the rest of the system.

It is desired to keep weight and volume of the accumulators to a minimum when these are to be included in a subsea solution. If the accumulators can be charged to a much higher pressure than the regulated working pressure, then each accumulator may store more energy and the size and weight of the accumulator may be reduced. This assumes a qualified pressure regulator. In connection with control of well head mounted equipment a very high pressure level is utilised for downhole functions and a medium pressure for actuator and connector functions. When the accumulators have a pressure sufficiently high to supply both downhole and other functions it may open for a simplification of the hydraulic system compared to what is common today.

This scenario implies a need for subsea accumulators having a large volume and a higher pressure class than what is available as standard equipment today. The highest design pressure available for standard bladder accumulators produced in large quantities today is 10 000 psi corresponding to 690 bar. There are however few suppliers having accumulators larger than 5 liters effective volume for this pressure class in their standard programme.

Most commonly the accumulator shell is defined based on the PED-directive concerning pressurised equipment (97/23/EC) passed in 1997 and implemented as Norwegian regulation in 1999. From May 29, 2002 the regulation is made absolute for new pressurised equipment to be used in Norway and/or to be sold within the EU.

Accumulator shells are today generally forged in China in large series. Using HIP'ing (Hot Isostatic Pressing) the accumulator supplier will have the advantage of producing in small series and give the client the choice between material thickness according to PED or other regulations as desired.

A bladder accumulator consists in principle of four parts:
a steel container—a normally forged steel container,
an internal rubber bladder separating gas and liquid,
a gas valve to precharge the accumulator, filling it with gas,
an oil valve to stop the bladder being squeezed out of the accumulator.

The forged pressure vessel of a high-pressure bladder accumulator is seamless and is generally produced from high-tensile chromium and molybdenum alloyed steel, but exist also in acid proof material for different pressures. The subsea market demands accumulators in acid proof materials.

In prior art the pressure vessel is forged to the desired shape from a forged hollow bar. The ends are heated and formed to a rounded shape wherein are later machined openings for placing valves for gas filling and oil supply, respectively.

It is desirable to produce acid proof pressure vessels for bladder accumulators having an effective volume of up to 50 liters in pressure class 15,000-20,000 psi at a competitive price. This is outside the standard supplier programme for all accumulator suppliers today.

The aim is to produce a first class seamless quality product by powder molding, so-called Hot Isostatic Pressing (HIP). HIP'ing is a new technique for production of pressure vessels for bladder accumulators and is a technical and economic alternative to prior art for production of large high-pressure accumulators in an acid proof material. The finished product will have the same shape as today's forged pressure vessels having wall thickness adapted to increased pressure class and pressure vessel regulations valid for the relevant market.

The present application relates to a method for production of an acid proof seamless pressure vessel and the method is characterised in the characteristics stated in the claims.

FIG. 1 shows a sectioned finished mounted cylindrical vessel having a hemispherical top and bottom consisting of an internal shell 1 held together with distance pins 2 to a lower part of an external shell 3 and a corresponding upper external shell 4 having a filling spout 5, wherein both the internal shell 1 and the external shells 3, 4 constitute molds of sheet material which in the further production process is used to fill the interstice before hot hardening together with the distance pins, so that a seamless vessel in a compact and homogeneous material results from a completed process.

Figure 2B:
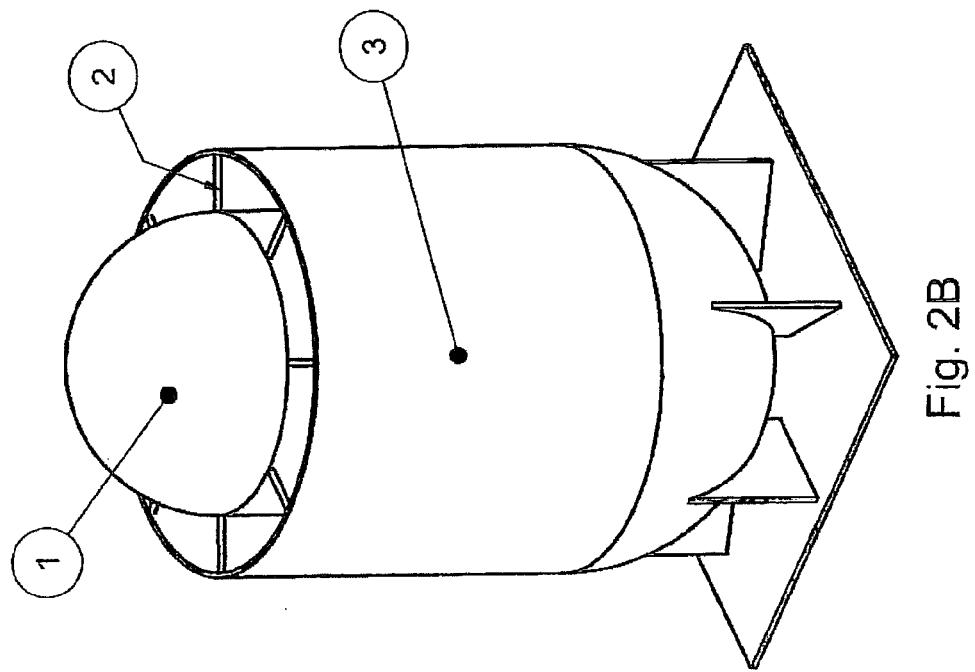
Figure 2A:
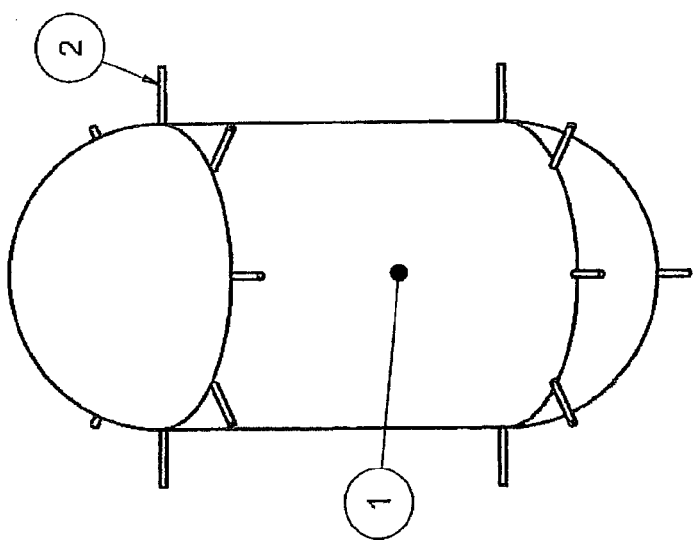

FIG. 2A shows in 3D an internal shell 1 fitted with a number of distance pins 2 in the same material as the finished HIP'ed material.

FIG. 2B shows in 3D a lower part of an external shall 3 having internal shell 1 with the distance pins 2 fitted.

The HIP-technique is a known production method for production of components from different powder materials like metal and ceramic powders. The blanks here constituting the internal shell 1, the lower part of the external shell 3, distance pins 2 and the hemispherical tops and bottoms are produced by means of respective sheet molds.

The internal shell 1 with the distance pins 2 deciding the wall thickness is led down into the lower part of the external shell 3 whereafter the hemispherical upper part 4 of the external shell with filling spout 5 closes the volume between internal and external shells which is filled with powder through the filling spout 5, and the container is placed in a HIP-process container for vacuuming, sealing, supply of high pressure inert gas like argon at high temperature such as 1000° C., to a compact homogenous material having better properties then forged steel.

Finally the blank is machined outside and inside to final embodiment by machining of surfaces and also openings for positioning of valves for gas filling and oil supply.

It is possible to use the same material for the internal and external mold as the HIP'ed material, and alternatively the molds are made of a material which is etched away in an acid bath. The choice of method is decided based on technical and economical production considerations.

The invention claimed is:

1. A method for production of a cylindrical acid proof seamless pressure vessel having hemispherical bottom and top by powder molding in a hot isostatic pressing (HIP) process, wherein the method comprises:
    producing an assembled and filled molding shell that includes:
        producing an internal shell, a lower part of an external shell, and an upper part of an external shell having a filling spout, the internal and external shells having corresponding hemispherical tops and bottoms and the internal and external shells each comprising a sheet mold,
        producing a plurality of distance pins,
        mounting the distance pins extending from the internal shell,
        inserting the internal shell into the lower part of the external shell,
        closing a volume between the internal and external shells with the upper part of the external shell, and
        filling the volume with a powder through the filling spout;
    placing the assembled and filled molding shell in process container;
    vacuuming and sealing the HIP-process container; and
    supplying the HIP-process container with an inert gas at a pressure and a temperature pursuant to a HIP process, for processing the powder in-between the shells together with the distance pins to a compact and homogenous vessel material.

2. The method of claim 1, wherein the closing of the volume between the internal and external shells with the upper part of the external shell occurs subsequent to the inserting of the internal shell into the lower part of the external shell.

3. The method of claim 1, wherein the inert gas comprises argon.

4. The method of claim 1, wherein the temperature is 1000 degrees Celsius.

5. The method of claim 1, wherein the distance pins consist of the vessel material following the HIP process.

6. The method of claim 1, further including machining an outside and inside surface of the cylindrical acid proof seamless pressure vessel.

7. The method of claim 6, further including positioning valves on the cylindrical acid proof seamless pressure vessel.

8. The method of claim 1, wherein the internal and external shells consist of the vessel material following the HIP process.

* * * * *

UNITED STATES PATENT AND TRADEMARK OFFICE
CERTIFICATE OF CORRECTION

PATENT NO.         : 8,894,913 B2                                      Page 1 of 1
APPLICATION NO.    : 13/121654
DATED              : November 25, 2014
INVENTOR(S)        : Egil Eriksen It is certified that error appears in the above-identified patent and that said Letters Patent is hereby corrected as shown below:

In The Claims

Column 4, Claim 1, Line 7, delete "process" and insert --a HIP-process-- therefor.

Signed and Sealed this
Twenty-eighth Day of April, 2015

Michelle K. Lee
*Director of the United States Patent and Trademark Office*